Figure 1:
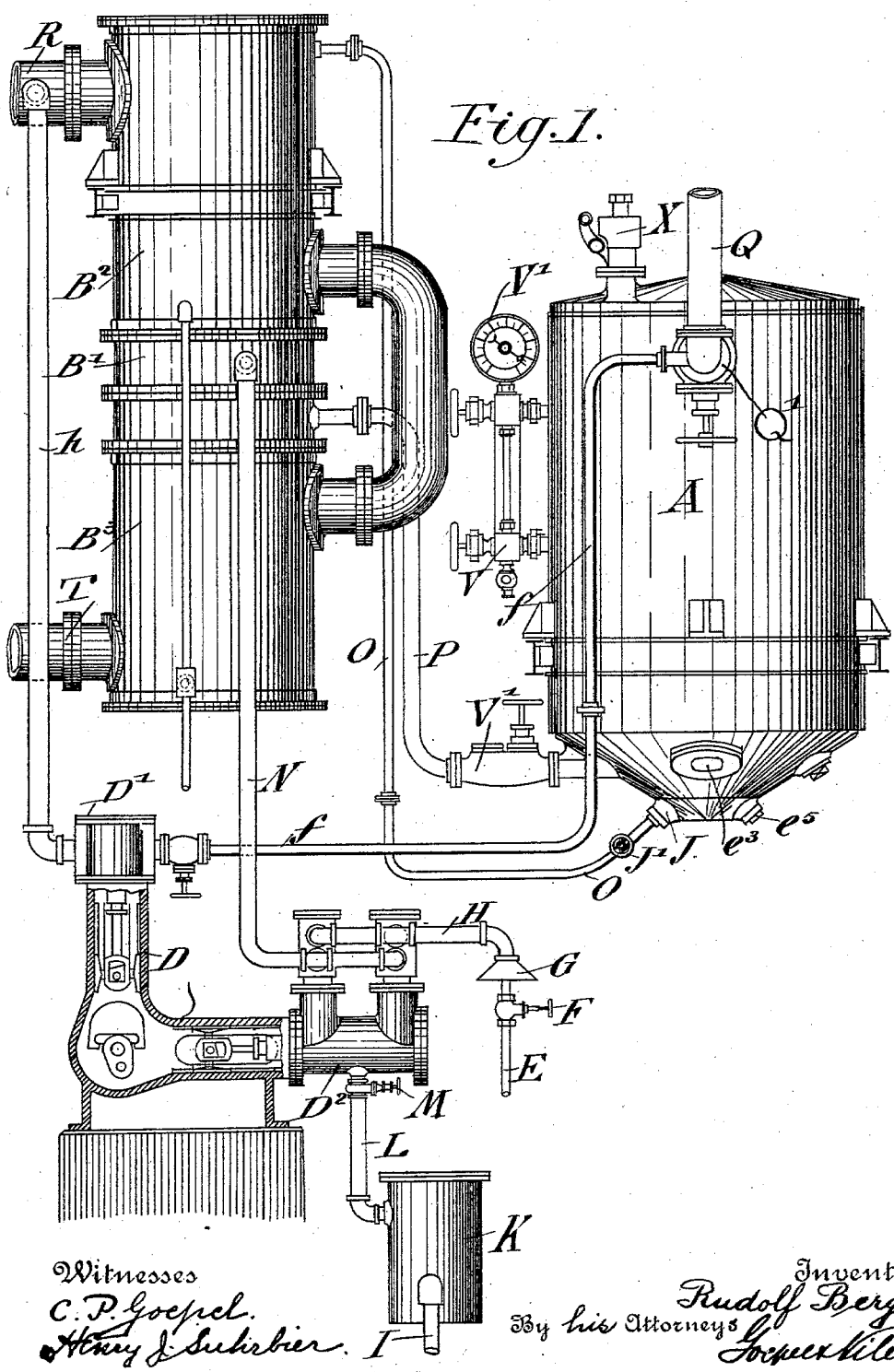

No. 751,972. PATENTED FEB. 9, 1904.
R. BERG.
PROCESS OF GENERATING MOTOR FLUIDS.
APPLICATION FILED MAR. 16, 1903.
NO MODEL. 2 SHEETS—SHEET 1.

Witnesses
C. P. Goepel.
Henry J. Suhrbier.

Inventor
Rudolf Berg.
By his Attorneys
Goepel Niles

No. 751,972. PATENTED FEB. 9, 1904.
R. BERG.
PROCESS OF GENERATING MOTOR FLUIDS.
APPLICATION FILED MAR. 16, 1903.
NO MODEL. 2 SHEETS—SHEET 2.

Witnesses
C. P. Goepel.
John J. Kittle.

Inventor
Rudolf Berg.
by Attorneys

No. 751,972. Patented February 9, 1904.

UNITED STATES PATENT OFFICE.

RUDOLF BERG, OF PITTSBURG, PENNSYLVANIA, ASSIGNOR OF ONE-HALF TO FERDINAND WENIG, OF PITTSBURG, PENNSYLVANIA.

PROCESS OF GENERATING MOTOR FLUIDS.

SPECIFICATION forming part of Letters Patent No. 751,972, dated February 9, 1904.

Application filed March 16, 1903. Serial No. 148,006. (No specimens.)

*To all whom it may concern:*

Be it known that I, RUDOLF BERG, a citizen of the United States, residing in Pittsburg, in the county of Allegheny and State of Pennsylvania, have invented certain new and useful Improvements in Processes of Generating Motor Fluids, of which the following is a specification.

This invention relates to certain improvements in processes of generating motor fluid for the operation of steam-engines, turbines, &c.; and the invention consists in bringing in direct contact an ignited gaseous combustible fuel under pressure with a portion of the liquid to be evaporated, so as to change the same into motor fluid; and the invention consists, further, of certain details of operation to attain the highest efficiency of generation and operation, as will be described hereinafter, and finally pointed out in the claims.

It is a well-known fact that the energy obtained from fuel in the methods of generating steam heretofore in use is but a very small percentage of the theoretical energy contained in the same. In consequence thereof the trend of improvements in methods of generating steam has been in the direction of fuel-saving devices, feed-water heaters, and other structures by which an economy in fuel was desired to be obtained. The nearest approach toward obtaining a greater amount of energy from the fuel was made in boilers composed of a large number of parts, so as to offer a large heating-surface to the fuel and cause thereby a rapid evaporation. However, even with these large surfaces exposed to the heating medium, improved means for insuring an efficient circulation in the boilers, and the many accessories for obtaining and retaining the highest amount of heating effect from the fuel the problem needs yet to be solved for obtaining an efficiency of operation of the power plant corresponding to the theoretical. The marked development of the past few years in engineering fields has failed to improve the methods of generating motor fluid correspondingly. The considerable percentage of the lost heat of steam plants of today is due to the radiation of heat from the furnace walls and settings and the incomplete combustion of the furnace-gases, which in their unused state are carried away through the smoke-stack. These losses and disadvantages are further increased by the inherent disadvantages of the boilers now in use, which have been fully set forth in my application for Letters Patent for motor-fluid generators, for which I have made application.

The large losses in the methods of steam-generating now in use would be lessened if, the cause of these losses being once ascertained, the endeavors of those interested be directed toward diminishing the same. As a means toward attaining this result, it would be necessary to obtain a more complete combustion of the heating medium and allow the heat generated by the same to come in direct contact with the liquid to be evaporated. The application of this basic principle affords a means for a better and more rapid generation of motor fluid; and for this purpose the invention consists of a process based on the foregoing principle, the use of which is intended to obviate the many objections attendant the methods now in use.

In carrying out my process an apparatus is used which is shown in the accompanying drawings and described more in detail in the application for Letters Patent heretofore referred to, in which—

Figure 2:
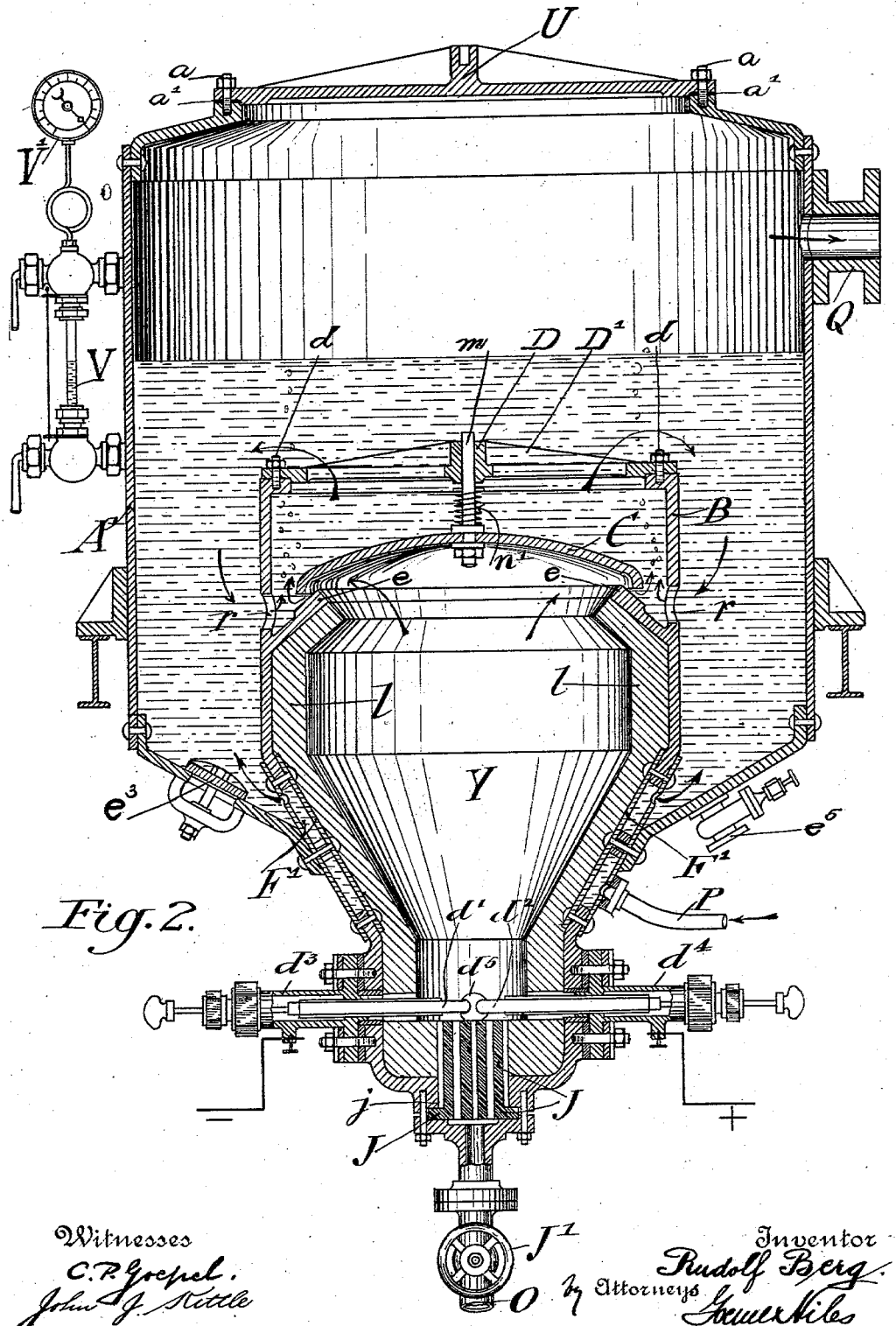

Figure 1 represents a side elevation, partly in section, showing a plant for generating motor fluid; and Fig. 2 a vertical central section through a generator proper.

Similar letters of reference indicate corresponding parts.

Referring to the drawings, A represents an improved motor-fluid generator for carrying out my process.

$B'$ $B^2$ $B^3$ is a feed-water heater of any approved construction, through which the feed-water and a combustible gas and air mixture are passed, so as to be heated up by the exhaust-steam or other motor fluid, which is admitted to the upper part of the feed-water heater through a pipe R, and D is a compressor, preferably of the type for which Letters Patent have been granted to me heretofore under date of December 24, 1901, No. 689,702. The steam-engine D' of the compressor D receives its steam from the generator A through the pipe $f$, which is connected with the main Q, the exhaust-steam for the motor fluid of the engine D' passing through pipe $h$ to pipe R of the feed-water heater B' B² B³. The compressor D takes up the water through the suction-pipe I, passes the same to a purifier K, and thence through a pipe L and valve M to the cylinder D² of the compressor.

E is the supply-pipe for the combustible gases, which may be obtained from any suitable source, and which is provided with a valve F for regulating the supply of gas.

G is a gas and air mixer which is connected by the air and suction pipe H with the compressor D. The combustible gas and air mixture thus sucked in is mixed in the compressor D² with the feed-water and subjected to isothermal compression in the same and then forced through the pipe N into the feed-water heater. The feed-water is heated to a temperature of 90° centigrade or more in the feed-water heater and conducted from the same through the pipe P and valve U' to the lower part of the generator A, while the combustible gas and air mixture, also heated in the feed-water heater to a temperature of 90° centigrade or more, is drawn off from the upper part of the feed-water heater and conducted through the pipe O and the twyer J into the combustion-chamber of the generator A.

The generator A is provided with the usual accessories of steam-boilers—namely, a water-gage V, a pressure-gage V', a manhole $e^3$, a safety-valve X, a discharge-valve $e^5$ in the bottom of the boiler for drawing off the sediment from the bottom of the generator when cleaning the same, main Q for conducting the motor fluid to the various motors, and supply gate-valve Q', &c. The exhaust-steam from the feed-water heater passes to the atmosphere through the pipe T at the lower part of the feed-water heater.

The generator A proper (shown in detail in Fig. 2) consists of a cylindrical vessel or boiler A', which is closed at its upper part by a top U, which is tightly held in position by screw-bolts $a$ and kept steam-tight by suitable packings $a'$. The bottom of the generator is made of conical shape and riveted or welded to the lower end of the cylindrical body of the generator A. A combustion-chamber Y is arranged in the generator and the bottom of the same, preferably made integral with the bottom of the combustion-chamber, which is provided at its lower end with an opening J for the insertion of the flanged twyer J, said twyer being connected with the supply-pipe O for the gas and air mixture. The twyer is provided with a plurality of passages or channels, so as to deliver the combustible gas and air mixture into the combustion-chamber without igniting the same in the supply-pipe on account of the cold walls of the twyer keeping the combustible mixture under the temperature of combustion. The combustion-chamber Y is provided with a fire-brick lining L over its entire surface and is closed at its upper end by a dome-shaped valve C, which fits tightly on the seat $e$, that is placed on the circumferential upper portion of the combustion-chamber. The dome-shaped valve C is provided with a central stem $m$, that is guided in a center sleeve D, which is supported by a frame D' of radial arms, said frame being attached to the upper end of a cylindrical extension B of the wall of the combustion-chamber Y, which forms the valve-chamber, as shown clearly in Fig. 2. The supporting-frame D' is attached by screws $d$ to the upper circumference of the cylindrical extension or valve chamber B. The level of the water in the generator A is maintained above the upper edge of the valve-chamber B, so as to keep all the parts of the combustion-chamber, dome-shaped valve, and the extension or valve chamber entirely submerged, the level of the water being indicated on the gage V. The valve-chamber B is provided with a number of circumferentially-arranged openings $r$ in its lower part, by which the circulation of the water around the wall of the valve-chamber is kept up. The dome-shaped valve C forms when resting on its seat $e$ a water-tight joint with the same. By the heating of the lining-walls of the combustion-chamber by the heat produced by the burning of the combustible gas and air mixture in the same motor fluid is generated and the pressure in the generator is gradually increased. This counter-pressure of the motor fluid, weight of water resting on the valve C, and force of spring $n'$ is overcome by the pressure of the ignited gas and air mixture in the combustion-chamber, so that the dome-shaped valve is slightly raised, and thereby the hot products of combustion permitted to pass upwardly at the entire circumference of the valve and come into direct contact with the water, so that the temperature of the same at the point of contact is raised sufficiently to convert the water into steam, which passing upwardly with the products of combustion fills the space in the generator above the level of the water and forms a motor fluid which is composed of a mixture of steam and the products of combustion. By the ebullition imparted to the water in the valve-chamber during the generation and liberation of steam an upward motion is imparted to the water by the steam and products of combustion, so that the water passes over the circumference of the valve-chamber B and then passes again in downward direction and inwardly toward the circumference of the dome-shaped valve C through the openings $r$ in the lower part of the valve-chamber, so that continuously a new supply of water is brought in contact with the upwardly-passing ignited products of combustion, thus insuring a continued circulation of the liquid in the generator. In this manner a large quantity of liquid is evaporated, causing thereby not only a rapid evaporation, but also a high pressure in the upper part or steam-space of the generator. As new quantities of heated-up feed-water are supplied by the pipe P to the generator, so as to keep up the proper water-level of the same, and as a continuous supply of ignited combustible gas and air mixture is supplied to the combustion-chamber, the generation of motor fluid is kept up and the motor fluid maintained at the required pressure in the upper part or dome of the generator. The hot products of combustion intermingling with the steam in the upper part of the generator serve to dry the steam—in fact, superheat the same.

The boiler A is provided around the lower part of the combustion-chamber with a conical double-walled space or jacket F', through which the feed-water is supplied before entering the generator. This annular jacket serves for heating up the already-heated feed-water. This heated-up water follows then the course shown by the arrows shown in Fig. 2 and is generated into motor fluid at the annular opening formed between the upper edge of the combustion-chamber and the annular edge of the dome-shaped valve in the same manner as before described. It will be seen that in this case the feed-water of high temperature comes in contact with the highly-heated products of combustion and affords thereby means for the rapid evaporation of the water.

The combustible gas described may be any suitable gas, either as produced by processes well-known or found in a natural state or the "waste gases" of the blast-furnace or any suitable oil or other liquid fuel properly atomized.

The generator shown in Fig. 2 is provided with a twyer arranged at the lower central portion of the combustion-chamber and an electric ignition device for the preliminary heating of the combustion-chamber. When the arc is formed between the electrodes $d'$ $d^2$ of the electric ignition device, which arc is observed through a sight-glass $d^5$ in the lower part of the combustion-chamber, the supply of combustible gas and air mixture to the twyer J is started and at the ignition of the same by the arc the electrodes drawn in outward direction into the protecting-housings $d^3$ $d^4$ provided for the same. The entering combustible gas and air mixture is then ignited by the arc until the fire-brick lining of the combustion-chamber is heated to a temperature above that of combustion of the gases. When this condition is attained, the supply of combustible gas and air is turned on, so as to give a full supply, whereupon the pressure in the combustion-chamber will have increased sufficiently to raise the dome-shaped valve, come in direct contact with the water, and prevent the water on and around the same from entering the combustion-chamber. It is seen by following the direction of the arrows that the parts are so arranged that the hottest water in the vessel comes in contact with the intensely-heated products of combustion, affording thereby good conditions for the rapid evaporation of the water. The generated motor fluid is stored in the upper part of the boiler and passes then by suitable mains to the motors to be operated thereby. As long as the supply of combustible gas and air mixture is continued and sufficient water is present an efficient evaporation of the same takes place, whereas when the supply of combustible gas and air mixture is diminished the upward-streaming ignited gases decrease correspondingly, permitting thereby the counter-pressure of the water to again force the valve down on its seat, thus preventing any liquid whatever from entering the interior of the combustion-chamber.

The generated motor fluid stored in the upper part of the vessel A consists, essentially, of steam, ($H_2O$,) nitrogen, (N,) and carbonic acid, ($CO_2$,) which mixture has an extremely high power of expansion, which is due to the low specific heat of the same and which consequently may be worked with the highest economy.

The manner in which my improved process is carried out is as follows: Water which has been preheated is supplied to the cylindrical boiler A' to about the height shown in the drawings and the top U tightly screwed to the top of the boiler A'. Current is turned on, so as to form an arc between the electrodes $d'$ $d^2$, which is observed through the sight-glass $d^5$. Thereupon the gate-valve J' is partly turned on and the combustible gas and air mixture ignited as it enters the combustion-chamber. This ignited gas heats up the fire-brick lining to a high temperature—that is, above the temperature of combustion of the combustible gas and air mixture. When this condition is obtained, the electrodes are drawn back in their protecting-housings $d^3$ $d^4$ and the supply of combustible gas and air turned on full and continually ignited as it enters the combustion-chamber. The large number of passages or channels in the twyer prevent the mixture from being ignited before the efflux of the same from the twyer. The pressure of the ignited mixture of combustible gas and air, together with the products of combustion, soon becomes so high in the combustion-chamber as to raise the dome-shaped valve and permit the heated products of combustion and ignited current of combustible gas and air to come in direct contact with the water to be evaporated and at the same time prevent any water from entering the combustion-chamber. An effective ebullition is caused at the circumference of the dome-shaped valve, and the bubbles of generated steam and products of combustion rise upwardly and disengage at the surface of the water, whereupon the motor fluid is gathered in the upper part or steam-space of the boiler. The steam and products of combustion being once disengaged from the water, the water moves toward the shell of the boiler and down along the sides of the same until it enters the circumferentially-arranged holes of the extension or valve chamber. Here the water again comes in contact with the heated products of combustion and ignited mixture of combustible gas and air, and the operation is repeated as above described, maintaining always an effective circulation. It is seen that the hottest water always comes in contact with the heating medium. The generated motor fluid is stored in the upper part of the generator and is dried or, in fact, superheated by the hot products of combustion and ready for being conducted off to the various motors to be operated thereby.

To obtain the highest efficiency of generation, the combustible gas and air is subjected, with the feed-water, to isothermal compression, then separated and heated, and then supplied to the generator.

It is seen that if the supply of air and gas is properly adjusted a complete combustion of the fuel is obtained, and thus the highest heating effect obtainable is utilized and the same brought in direct contact with the liquid to be evaporated without loss by radiation, convection, and conduction of the shell of the boiler, as attendant the boilers now in use.

Having thus described my invention, I claim as new and desire to secure by Letters Patent—

1. The process herein described of generating motor fluid, which consists in mixing a combustible gas with air, compressing the mixture in presence of water, separating the water from the mixture, igniting the mixture, and bringing the ignited mixture in direct contact with the liquid to be evaporated, substantially as set forth.

2. The process herein described of generating motor fluid, which consists in mixing a combustible gas with air, compressing the mixture in presence of water, heating the compressed mixture and water, separating the water from the mixture, supplying the heated water to a closed vessel, supplying the heated combustible gas and air mixture under pressure to the closed vessel, igniting the mixture of combustible gas and air in the same, and bringing the ignited mixture in direct contact with the heated water in the vessel, substantially as set forth.

3. The process herein described of generating motor fluid, which consists in mixing a combustible gas with air, subjecting the mixture to an isothermal compression with water, separating the water from the mixture, igniting the mixture, and bringing the ignited mixture in direct contact with the liquid to be evaporated, substantially as set forth.

4. The process herein described of generating motor fluid, which consists in mixing a combustible gas with air, subjecting the mixture to an isothermal compression with water, heating the compressed mixture and water, separating the water from the mixture, supplying the water to a suitable closed vessel, supplying the heated combustible gas and air to the closed vessel, igniting the mixture of combustible gas and air in the same, and bringing the ignited mixture in direct contact with the heated water in the vessel, substantially as set forth.

In testimony that I claim the foregoing as my invention I have signed my name in presence of two subscribing witnesses.

RUDOLF BERG.

Witnesses:
S. J. TOOLE,
P. F. TOOLE.